United States Patent
Taguchi et al.

(10) Patent No.: US 6,503,338 B1
(45) Date of Patent: Jan. 7, 2003

(54) LEAD-FREE SOLDER ALLOYS

(75) Inventors: Toshihiko Taguchi, Saitama (JP); Rikiya Katoh, Sohka (JP); Yoshitaka Toyoda, Satte (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/559,062

(22) Filed: Apr. 28, 2000

(51) Int. Cl.[7] ............................................. B23K 35/363
(52) U.S. Cl. ........................... 148/23; 148/24; 420/557; 420/562
(58) Field of Search ..................... 75/255; 420/557, 420/562; 148/24, 23

(56) References Cited

U.S. PATENT DOCUMENTS

| | | | | |
|---|---|---|---|---|
| 5,256,370 A | | 10/1993 | Slattery et al. ............. | 420/557 |
| 5,344,607 A | | 9/1994 | Gonya et al. ............... | 420/562 |
| 5,455,004 A | * | 10/1995 | Slattery et al. ............. | 420/562 |
| 5,538,686 A | * | 7/1996 | Chen et al. ................. | 420/557 |
| 5,851,482 A | * | 12/1998 | Kim ............................ | 420/557 |
| 5,942,185 A | * | 8/1999 | Nakatsuka et al. ......... | 420/562 |
| 5,985,212 A | * | 11/1999 | Hwang et al. ............... | 420/560 |
| 6,033,488 A | * | 3/2000 | An et al. ...................... | 148/24 |
| 6,086,687 A | * | 7/2000 | Oud et al. ................... | 148/400 |

FOREIGN PATENT DOCUMENTS

| | | |
|---|---|---|
| JP | 57011793 | 1/1982 |
| JP | 59189096 | 10/1984 |
| JP | 615476 | 1/1994 |
| JP | 6344180 | 12/1994 |
| JP | 71178 | 1/1995 |
| JP | 740079 | 2/1995 |
| JP | 751883 | 2/1995 |

\* cited by examiner

*Primary Examiner*—Daniel J. Jenkins
(74) *Attorney, Agent, or Firm*—Michael Tobias

(57) ABSTRACT

A lead-free solder alloy which has a relatively low melting temperature and which is suitable for soldering electronic devices consists essentially of from 5 to 9 mass % of Zn, from 2 to 15 mass % of Bi, optionally from 0.001 to 1 mass % of P or from 0.001 to 0.1 mass % of Ge, and a balance of Sn. The solder alloy has a liquidus temperature of at most 220° C.

35 Claims, No Drawings

LEAD-FREE SOLDER ALLOYS

BACKGROUND OF THE INVENTION

1. Field of the Invention

The present invention relates to solder alloys which are completely free from lead and are suitable for use in soldering of electronic devices without producing thermal damage.

2. Description of the Related Art

Sn—Pb alloys have long been used for soldering in the electronics industry, and they are still the most popular alloys for soldering electronic devices to printed circuit boards or other substrates.

When electronic appliances such as televisions, radios, audio or video recorders, computers, pocket telephones, and copying or printing machines are to be discarded, they are typically disposed of in landfills, since they commonly include large amounts of synthetic resins (used for housings and printed circuit boards) and metals (used for frames and connecting wires) which are not suitable for incineration.

In recent years, acid rain (the phenomenon in which rain becomes highly acidic due to discharge of sulfur oxide into the atmosphere by extensive use of fossil fuels such as coals, gasolines, and fuel (heavy) oils) has become increasingly serious. Acid rain causes the solders used in discarded electronic appliances present in landfills to dissolve and contaminate groundwater. If groundwater contaminated with lead is ingested by a person for many years, the accumulation of lead in the person's body may result in lead poisoning. For this reason, there is a need for a lead-free solder alloy in the electronics industry.

Conventional lead-free solder alloys are Sn-based alloys such as Sn—Ag and Sn—Sb alloys. Of Sn—Ag alloys, an Sn3.5-Ag alloy has a eutectic composition with a melting temperature of 221° C. Even if this composition, which has the lowest melting temperature among Sn—Ag alloys, is used as a solder alloy, the soldering temperature will be as high as from 260° C. to 280° C., which may cause thermal damage to heat-sensitive electronic devices during soldering, thereby deteriorating their functions or rupturing the devices. Of Sn—Sb alloys, an Sn5-Sb alloy has the lowest melting temperature, but its melting temperature is still as high as 235° C. at the solidus line and 240° C. at the liquidus line. Therefore, the soldering temperature is in the range of from 280° C. to 300° C., which is higher than that of an Sn3.5-Ag alloy, and thermal damage to heat-sensitive electronic devices cannot be avoided.

In view of the relatively high melting temperatures of Sn—Ag and Sn—Sb alloys, many attempts to lower their melting temperatures have been proposed. See, for example, Japanese Patent Applications Laid-Open (JP A1) Nos. 6-15476(1994), 6-344180(1994), 7-1178(1995), 7-40079 (1995), and 7-51883(1995).

The solder alloys disclosed in these Japanese patent applications contain a large proportion of Bi and/or In (indium) in order to lower their melting temperatures. Although Bi and In are both effective for decreasing the melting temperatures of Sn—Ag and Sn—Sb solder alloys, the addition of Bi and/or In in a large amount is accompanied by a number of problems. Addition of Bi in a large proportion makes the solder alloys very hard and brittle. As a result, it is impossible or difficult to subject the solder alloys to plastic working to form wire, and when the solder alloys are used to solder electronic devices, the soldered joints may be readily detached when subjected to only a slight impact. Addition of indium in a large proportion to solder alloys is undesirable due to its very high cost.

In order to avoid thermal damage to electronic devices during soldering, the soldering temperature should generally be at most 250° C. In order to perform soldering at a temperature of at most 250° C., it is desirable that the liquidus temperature of the solder alloy be at most 220° C. and preferably at most 200° C.

However, when attempting to lower the melting temperatures of Sn—Ag and Sn—Sb solder alloys by addition of Bi and/or In, it is difficult to decrease the liquidus temperature of the alloys to 200° C. or below unless Bi and/or In is added in a large amount. Furthermore, even though it is possible to provide a solder alloy having a liquidus temperature lowered to 200° C. or less by addition of Bi and/or In, the solidus temperature thereof, at which solidification of the alloy is completed, may be excessively lowered, so that it takes a prolonged period of time to completely solidify the solder alloy in soldered joints formed by soldering. As a result, if the soldered joints are subjected to any vibration or impact before they are completely solidified, they may crack.

Another problem of conventional lead-free solder alloys is that those lead-free alloys having liquidus temperatures which are low enough to be close to their solidus temperatures do not have satisfactory mechanical properties such as tensile strength and elongation, thereby forming soldered joints which have poor bonding strength or which are liable to be detached upon impact.

SUMMARY OF THE INVENTION

It is an object of the present invention to provide lead-free solder alloys having a liquidus temperature which is less than 220° C. and preferably less than 200° C. and a solidus temperature, at which solidification of the alloy is completed or substantially completed, which is 160° C. or higher, and preferably 170° C. or higher.

It is another object of the present invention to provide lead-free solder alloys which have good bonding strength when used for soldering.

A more specific object of the present invention is to provide lead-free solder alloys having the following properties.

1) The alloys can be used at a soldering temperature below 250° C. and preferably from 230° C. to 240° C. so as to prevent thermal damage to heat-sensitive electronic devices during soldering.

2) The alloys have excellent solderability.

3) The alloys have a narrow solidification temperature range between the liquidus and solidus temperatures such that the alloy's are rapidly solidified after soldering in order to prevent the resulting soldered joints from cracking when subjected to vibration or an impact immediately after soldering, the temperature range being close to the eutectic temperature of an Sn—Pb alloy (183° C.).

4) The alloys produce soldered joints having a bonding strength which is high enough to prevent the joints from being detached when subjected to an impact.

5) The alloys can be easily subjected to plastic working to form wire so that the alloys can be used for soldering with a soldering iron.

The present inventors found that alloys consisting essentially of Zn, Bi, optionally one of P and Ge, and a balance of Sn in specific proportions can provide solder alloys having a low liquidus temperature which enables dip soldering to be performed in a temperature range at which electronic components being soldered will not undergo thermal damage. Furthermore, it was found that by appropriately adjusting the proportions of Zn and Bi, the solidus temperatures of the alloys can be close to their liquidus temperatures, thereby enabling molten solder to rapidly solidify following soldering to avoid problems such as cracking or detachment of soldered joints. In addition, the alloys have a tensile strength and ductility which enables them to be plastically formed into wire suitable for use with a soldering iron. Thus, these solder alloys can be satisfactorily used in place of conventional Sn—Pb alloys, and because these solder alloys are lead free, they prevent contamination of groundwater by lead which occurs with conventional Sn—Pb alloys.

According to one aspect of the present invention, a lead-free solder alloy consists essentially of from 5 to 9 mass % of Zn, from 2 to 15 mass % of Bi, and a balance of Sn.

According to another aspect of the present invention, a lead-free solder alloy consists essentially of from 5 to 9 mass % of Zn, from 2 to 15 mass % of Bi, P and/or Ge, and a balance of Sn.

DESCRIPTION OF PREFERRED EMBODIMENTS

The present invention will now be described in detail. In the following description, all percents concerning alloy compositions are by mass.

The lead-free solder alloys according to the present invention are intended as a substitute for conventional Sn—Pb alloys. Therefore, it is desired that the melting temperatures, i.e., the liquidus and solidus temperatures of these alloys be close to the eutectic temperature of Sn—Pb alloys (183° C.). The liquidus temperatures are preferably at most 220° C., more preferably at most 210° C. and still more preferably at most 200° C. As long as a solder alloy has a liquidus temperature below 220° C., soldering can be performed at a temperature below 250° C., thereby eliminating or minimizing thermal damage to heat-sensitive electronic devices. The solidus temperatures of the solder alloys are preferably above 160° C., more preferably above 170° C., and still more preferably above 180° C. If the solidus temperatures are lower than 160° C., it takes a long time for the alloys to solidify after soldering, and if the resulting soldered joints are subjected to any vibration or impact before they are completely solidified, they will crack.

The bonding strength of a soldered joint is correlated to the tensile strength of the solder alloy used, and the level of tensile strength required for solder alloys varies depending on the purposes of soldering. The tensile strength (at break) required for solder alloys used to solder electronic devices is at least 49 Mpa (5 kgf/mm$^2$). A solder alloy having a tensile strength less than 49 Mpa (5 kgf mm$^2$) is not reliable, since soldered joints formed therefrom may be detached when subjected to impact.

It is generally desirable for solder alloys to have a percent elongation which is high enough for the alloys to be deformed into wire by plastic working in order for the alloys to be used in the form of wire when soldering is performed with a soldering iron. In this case, at least 10% elongation is normally desirable for solder alloys in order to perform plastic working smoothly.

The solder alloys according to the present invention meet these requirements for mechanical properties, i.e., a tensile strength at break of at least 49 Mpa (5 kgf/mm$^2$) and an elongation of at least 10%. Preferably, they have a tensile strength of at least 10 kgf/mm$^2$ and/or an elongation of at least 20%.

According to one aspect of the present invention, a lead-free solder alloy consists essentially of from 5 to 9 mass % of Zn, from 2 to 15 mass % of Bi, optionally one or more of P in an amount of from 0.001 to 1.0 mass % and Ge in an amount of from 0.001 to 0.1 mass %, and a balance of Sn. The proportions of the, above components were selected for the following reasons. Zn: 5%–9%

In an Sn—Zn alloy containing a relatively large amount of Bi, if the content of Zn (zinc) is less than 5% or more than 9%, the alloy will not have a liquidus temperature below 200° C. The Zn content is therefore 5%–9%, more preferably from 5%–8%, and still more preferably 6.5%–7.5%.
Bi: 2%–15%

Addition of Bi (bismuth) to an Sn—Zn alloy is effective for decreasing the melting temperature of the alloy. However, the melting point of the alloy is not appreciably lowered if Bi is added in an amount of less than 2%. On the other hand, addition of more than 15% Bi to an Sn—Zn alloy makes the alloy so hard and brittle that it is difficult to apply plastic working to deform the solder alloy into wire. Furthermore, after soldering is completed, the resulting soldered joints may be readily detached when subjected to impact. Therefore, the content of Bi in the alloy is 2%–15%, preferably 5%–10%, more preferably 7%–9%, and still more preferably 7.5%–8.5%.

In a preferred embodiment, the total content of Zn and Bi is 18% or less. More preferably, the total content of Zn and Bi is 15% or less.
P: 0.001%–1.0%

The addition of P (phosphorus) to an Sn—Zn—Bi alloy is effective for preventing oxidation during heating.
Ge: 0.001%–0.1%

The addition of Ge (germanium) to an Sn—Zn—Bi alloy is also effective for preventing oxidation during heating.

The present invention will now be further illustrated by the following examples, which are to be considered in all respects as illustrative and not restrictive.

Molten solder alloys having the compositions shown in the following table were cast into tensile test rods each having a central neck portion measuring 50 mm in length and 10 mm in diameter according to JIS specifications. The tensile test rods were used to determine the tensile strength and elongation at break also shown in the table of each solder alloy. The table further includes the solidus and liquidus temperatures of each solder alloy determined by differential thermal analysis.

In the table, alloys 2, 3, 6, 7, 16, and 17 are alloys according to the present invention, while the remaining alloys are comparative examples.

A molten solder alloy of Alloy No. 2 was poured into a solder bath of an automatic dip soldering apparatus and used to solder electronic devices to printed circuit boards while the temperature of the molten solder alloy was maintained at 240° C. Visual inspection of the soldered electronic devices on the printed circuit boards showed no signs of thermal damage or deterioration. The other solder alloys according to the present invention in the table can be used for soldering in the same manner. Since all the solder alloys according to the present invention shown in the table have liquidus temperatures of at most 220° C., dip soldering can be performed at a temperature of molten solder alloy (soldering temperature) of 250° C. or below. Therefore, thermal damage to electronic devices can be eliminated or minimized. Also it is noted that the solidus temperatures of these alloys are all at least 160° C., giving narrow solidification temperature ranges, thereby ensuring that the molten solder alloy in soldered joints is rapidly solidified in a short period after soldering and the formation of cracks is minimized.

| Alloy No. | Alloy Composition (mass %) | | | | Melting Temperature (° C.) | | Tensile Strength (MPa) | Elongation (%) |
|---|---|---|---|---|---|---|---|---|
| | Sn | Zn | Bi | Other | Solidus Temp. | Liquidus Temp. | | |
| 1 | bal. | 9 | — | — | 199 | 199 | 65.7 | 64 |
| 2 | bal. | 8 | 3 | — | 188 | 199 | 84.3 | 40 |
| 3 | bal. | 6 | 8 | — | 175 | 196 | 106.9 | 10 |
| 4 | bal. | 2 | 11 | — | 166 | 215 | 104.9 | 20 |
| 5 | bal. | 4 | 11 | — | 166 | 202 | 103.0 | 16 |
| 6 | bal. | 6 | 11 | — | 165 | 197 | 106.9 | 10 |
| 7 | bal. | 8 | 11 | — | 168 | 218 | 113.8 | 10 |
| 8 | bal. | 2 | 16 | — | 135 | 206 | 104.9 | 14 |
| 9 | bal. | 4 | 16 | — | 135 | 196 | 103.0 | 13 |
| 10 | bal. | 6 | 16 | — | 135 | 192 | 106.9 | 14 |
| 11 | bal. | 8 | 16 | — | 133 | 233 | 111.8 | 10 |
| 12 | bal. | 2 | 22 | — | 136 | 200 | 99.0 | 20 |
| 13 | bal. | 4 | 22 | — | 135 | 189 | 98.1 | 18 |
| 14 | bal. | 6 | 22 | — | 134 | 211 | 96.1 | 5 |
| 15 | bal. | 8 | 22 | — | 135 | 272 | 114.7 | 9 |
| 16 | bal. | 8 | 3 | P0.01 | 188 | 199 | 85.3 | 38 |
| 17 | bal. | 8 | 3 | Ge0.05 | 189 | 199 | 81.0 | 43 |

All the solder alloys according to the present invention in the table had a tensile strength of at least 5 kgf/mm$^2$ and at least 10% elongation. Thus, these solder alloys can form soldered joints with sufficient bonding strength which will not be dislodged upon impact, and the alloys can be satisfactorily subjected to plastic working to form wire.

In the comparative examples having a Bi content of greater than 15%, the solidus temperatures of the alloys were far below the liquidus temperatures, making it difficult to solidify these alloys after soldering without problems such as the formation of cracks or the dislodging of soldered joints.

It will be appreciated by those skilled in the art that numerous variations and modifications may be made to the invention as described above with respect to specific embodiments without departing from the spirit or scope of the invention as broadly described.

What is claimed is:

1. A lead-free solder alloy for use in soldering electronic devices to a printed circuit board, which consists essentially of:
   from 5 to 9 mass % of Zn,
   from 2 to 15 mass % of Bi,
   from 0.001 to 1 mass % of P and/or from 0.001 to 1 mass % of Ge, and
   a balance of Sn.

2. A lead-free solder alloy as set forth in claim 1 wherein the total content of Zn and Bi is at most 18%.

3. A lead-free solder alloy as set forth in claim 1 wherein the Zn content is at most 8%.

4. A lead-free solder alloy as set forth in claim 1 wherein the content of Bi is 5–10%.

5. A lead-free solder alloy as set forth in claim 1 having a liquidus temperature of at most 210° C.

6. A lead-free solder alloy as set forth in claim 1 having a solidus temperature of at least 160° C.

7. A lead-free solder alloy as set forth in claim 1 wherein the Zn content is greater than 5%.

8. A lead-free solder alloy as set forth in claim 1 wherein the Zn content is at least 6%.

9. A lead-free solder alloy as set forth in claim 1 wherein the Zn content is 6.5–7.5%.

10. A soldering method comprising soldering an electronic device with the solder alloy of claim 1.

11. A soldering method as set forth in claim 10 wherein the solder alloy has a Zn content of greater than 5%.

12. A soldering method as set forth in claim 10 wherein the solder alloy has a Zn content of at least 6%.

13. A soldering method as set forth in claim 10 wherein the solder alloy has a Zn content of 6.5–7.5%.

14. A soldering method as set forth in claim 10 including soldering the electronic device to a substrate with the solder alloy.

15. A soldering method as set forth in claim 14 including soldering the electronic device to a printed circuit board with the solder alloy.

16. A soldering method as set forth in claim 10 including dip soldering the electronic device with the solder alloy.

17. A soldering method as set forth in claim 10 wherein the total content of Zn and Bi is at most 18%.

18. A soldering method as set forth in claim 10 wherein the Zn content is at most 8%.

19. A soldering method as set forth in claim 10 wherein the content of Bi is 5–10%.

20. A soldering method as set forth in claim 10 wherein the solder alloy has a liquidus temperature of at most 210° C.

21. A soldering method as set forth in claim 10 wherein the solder alloy has a solidus temperature of at least 160° C.

22. A solder joint which joins two members to each other and comprises the solder alloy of claim 1.

23. A solder joint as set forth in claim 22 wherein the solder alloy has a liquidus temperature of at most 210° C.

24. A solder joint as claimed in claim 22 wherein the solder alloy has a solidus temperature of at least 160° C.

25. A solder joint as claimed in claim 22 wherein the total content of Zn and Bi of the solder alloy is at most 18%.

26. A solder joint as claimed in claim 22 wherein the Zn content of the solder alloy is at most 8%.

27. A solder joint as claimed in claim 22 wherein the Zn content of the solder alloy is greater than 5%.

28. A solder joint as claimed in claim 22 wherein the Zn content of the solder alloy is at least 6%.

29. A solder joint as claimed in claim 22 wherein the Zn content of the solder alloy is 6.5–7.5%.

30. A solder joint as claimed in claim 22 wherein the Bi content of the solder alloy is 5–10%.

31. A solder joint as claimed in claim 22 having a tensile strength of at least 10 kgf/mm$^2$.

32. A solder joint as claimed in claim 22 having an elongation of at least 20%.

33. A solder joint as claimed in claim 22 wherein one of the members comprises an electronic device.

34. A solder joint as claimed in claim 33 wherein one of the members comprises a substrate.

35. A solder joint as claimed in claim 33 wherein one of the members comprises a printed circuit board.

* * * * *